United States Patent Office 3,232,112
Patented Feb. 1, 1966

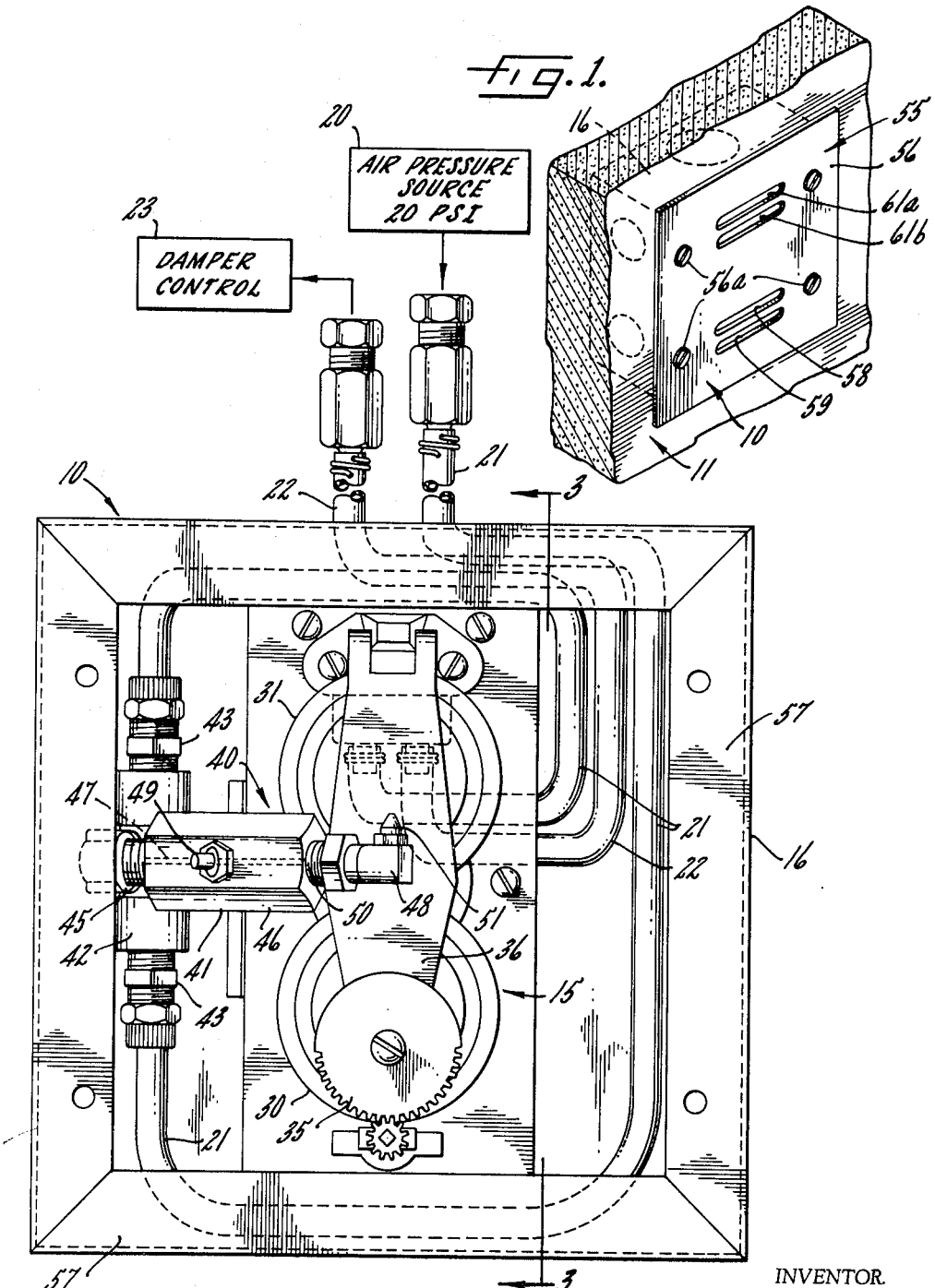

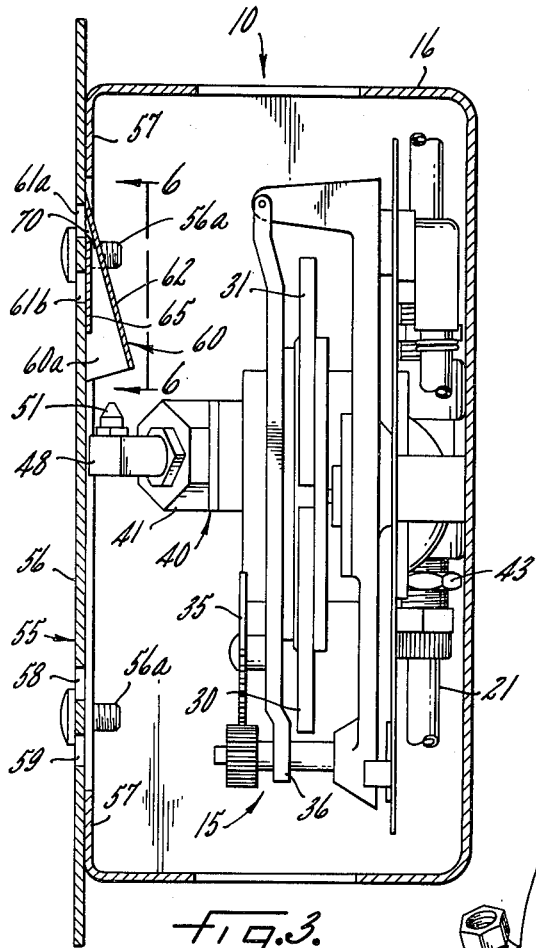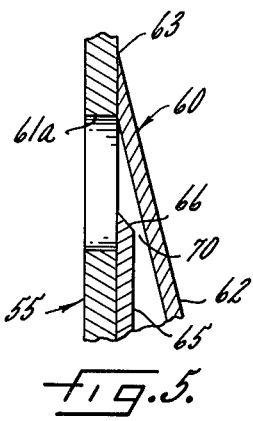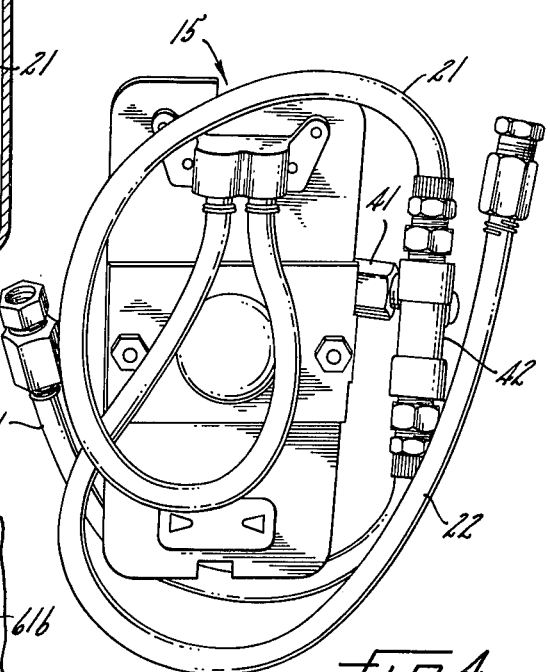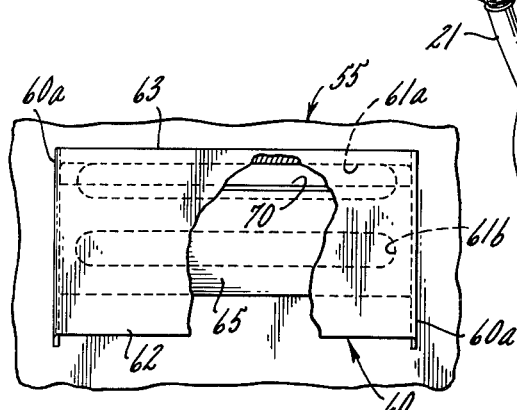

3,232,112
THERMOSTAT WITH ASPIRATED AIR
William P. Wehlau, Niles, Ill., assignor to The Powers Regulator Company, Skokie, Ill., a corporation of Illinois
Filed Oct. 28, 1963, Ser. No. 319,177
3 Claims. (Cl. 73—349)

This invention relates in general to thermostatic temperature regulation in enclosed gaseous environs such as dwellings and the like. It deals more particularly with apparatus for improving the performance of a temperature regulating thermostat.

It is common practice to control the temperature in a dwelling, for example, or any enclosure, by means of a temperature sensing thermostat which is effective to adjust a heating or cooling supply of hot or cold air to the enclosure as a function of the temperature therein. One widely used type of thermostatic device employs an air pressure control system which is sensitive to variations in temperature within the enclosure. A control pressure increases or decreases with a rise or drop in ambient air temperature and provides an indication, according to a predetermined schedule, of the air temperature in the enclosure.

It is desirable, of course, to obtain a consistent and accurate response to actual enclosure temperature insofar as the thermostatic device is concerned. Assuring that a representative sampling of the ambient air in the enclosure is constantly available to the sensing equipment of the thermostatic device aids in accomplishing this end. It is an object of the present invention to provide a means for subjecting the sensing equipment of the thermostatic device to such a representative sampling of air in a room, for example, at all times.

It is another object of the present invention to provide a new and improved aspirator arrangement for directing ambient air from an enclosure across temperature sensing equipment in a thermostat, in a predetermined manner.

It is still another object to provide an aspirator arrangement which is especially suited for directing ambient air across the sensing equipment of a thermostat in an enclosed and recessed wall box.

It is yet another object to provide an aspirator arrangement of the aforedescribed character which facilitates fine adjustment to suit air circulation conditions and provide the most sensitive temperature response possible.

It is a further object to provide an aspirator arrangement of the aforedescribed character which draws aspirating air from the air pressure control system of the thermostatic device.

The foregoing and other objects are realized in accordance with the present invention by providing a new and improved aspirator apparatus for circulating ambient air or the like in a predetermined manner over the temperature sensitive control equipment of a thermostat employing an air pressure control system. Ambient air is drawn into a recessed wall enclosure, for example, containing the thermostat, at a predetermined rate and directed across its temperature sensitive equipment by a controlled jet of air bled from the air pressure control system of the thermostat. The rate of passage of ambient air is adjusted by varying the air bleed rate from the air pressure control system. Adjusting the rate of ambient air flow facilitates metering it past the temperature sensing equipment just fast enough for quick and accurate thermostatic response without effecting false response.

The invention, both as to its organization and method of operation, taken with further objects and advantages thereof, will best be understood by reference to the following description taken in conjunction with the accompanying drawings, in which:

FIGURE 1 is a perspective view of a thermostatic device incorporating an aspirator arrangement embodying features of the present invention, set in the wall of a dwelling room, for example, with parts broken away;

FIGURE 2 is an enlarged front elevational view of the thermostatic device illustrated in FIGURE 1, with its cover removed to display a thermostat of the type employing an air pressure control system and incorporating features of the present invention;

FIGURE 3 is a sectional view taken along line 3—3 of FIGURE 2, with the cover in place;

FIGURE 4 is a rear perspective view of the thermostat separated from the housing in FIGURE 2;

FIGURE 5 is an enlarged sectional view of a portion of the ambient air egress port means embodying features of the present invention; and FIGURE 6 is an enlarged view taken along line 6—6 of FIGURE 3.

Referring now to the drawings, and particularly to FIGURE 1, a thermostat "package" 10 is shown seated in recessed relationship in the wall 11 of a conventional dwelling or the like. The thermostat package 10 is operatively connected in a well known manner to a heating and/or cooling system (not shown) whereby the heating and/or cooling of the room is controlled by the thermostat package 10 to maintain a predetermined ambient temperature in the room. Ambient temperature in the room is continually sensed by the thermostat package according to features of the present invention and the heating and/or cooling of the room controlled as a direct function of such sensed temperatures.

The thermostat package 10 is illustrated in greater detail in FIGURES 2–4. There it will be seen that the package 10 includes a thermostat 15 mounted within the confines of a recessed wall housing 16 and operated by air pressure. The thermostat 15, which in detail forms no part of the present invention, is in this case a direct acting thermostat which utilizes air pressure to control a mixing damper (not shown) supplying, hot or cold air to a room or the like.

The direct acting thermostat 15 increases control air pressure with a rise in ambient air temperature and decreases control air pressure with a drop in ambient air temperature. The control air pressure is, in turn, preferably connected directly to the damper motor (not shown) of a mixing damper for controlling the position of hot and cold blades (not shown). Thus, with an increase in room temperature the thermostat 15 increases the control pressure to the damper motor to close the hot blade and open the cold blade while, conversely, with a drop in room temperature the thermostat 15 reduces the control pressure to close the cold and open the hot blade. The mixing damper is preset in advance to provide a flow of air of predetermined optimum temperature, of course, for a predetermined pressure setting indicative of the selected temperature.

The thermostat 15 is connected to a source of air 20, under a pressure of in the neighborhood of about 20 p.s.i., through a supply pipe 21. The thermostat 15 meters the flow of this air under pressure from the source 20, through an exhaust pipe 22, to the damper control, seen diagrammatically at 23, to control the flow of hot or cold air to the room as a function of the ambient air temperature to which the thermostat 15 is subjected in its housing 16.

It has been pointed out above, of course, that the thermostat 15 forms no specific part of the present invention and, accordingly, it is not illustrated or described in any substantial detail. Suffice it to say that the thermostat 15 includes thermostatic pressure discs 30 and 31 which react to changes in temperature in the ambient air surrounding them to control the metered flow of air pressure from the source 20 to the damper control 23. In the thermostat 15 illustrated, which is manufactured and sold by Powers Regulator Company, assignee of the present invention, a sensitivity of about 2.5 p.s.i. per degree Fahrenheit change in ambient temperature is realized. To set the thermostat 15 at a predetermined temperature, a temperature set wheel 35 is manipulated to bring a predetermined mechanical pressure to bear on the thermostatic discs 30 and 31 through the medium of the lever 36. The temperature at which the thermostat 15 will meter a neutral air pressure to the damper control 23, ten p.s.i. for example, is thus varied.

It is important, of course, that a representative sampling of the ambient air in the room which is having its temperature controlled be in surrounding relationship with the thermostatic discs 30 and 31. With the thermostat 15 recessed in a wall housing 16, for example, this end is not always readily effected. In fact, it is not uncommon for air within such a housing 16 to become stagnated, almost insulating the discs 30 and 31, and tending to cause indications of higher temperatures than actually exist within the room. The constant, yet regulated slow flow of ambient air across the thermostatic disc 30 and 31, according to the present invention, is an advantageous departure from such an arrangement.

According to the present invention, an aspirator arrangement 40 accomplishes this end by providing a steady but regulated flow of ambient air across the thermostatic discs 30 and 31. The aspirator arrangement 40 draws air under pressure from the air pressure system of the thermostat 15 and directs it at a controlled, adjustable rate out of the housing 16. The effect of this controlled egress of air from the housing 16 is to draw ambient air into the housing 16 and over the thermostatic discs 30 and 31 at a predetermined rate.

The aspirator arrangement 40 includes an air jet assembly 41 which is interposed in the supply pipe 21 supplying air under pressure to the thermostat 15, as best seen in FIGURE 2. The air jet assembly 41 includes a T fitting 42 secured in the conduit 21 by conventional threaded couplings 43. The T fitting 42 includes an outwardly extending short pipe leg 45 into which an aspirator head 46 is fitted in any well known manner. A small air passage 47 extends through the aspirator 46 from the pipe leg 45 to a nozzle assembly 48. An adjustable needle valve 49 in the aspirator head 46 facilitates control of the flow of air through the passage 47 and, accordingly, to the nozzle assembly 48.

The nozzle assembly 48 includes a threaded fitting 50 which screws into the aspirator head 46 in communication with the passage 47, and a jet 51 extending at right angles from the fitting. The jet 51 is pointed upwardly, as will be noted, parallel to the vertical axis of the thermostat 15 and the cover 55 of the housing 16.

The cover 55 comprises a rectangular plate 56 which overlies inwardly turned flanges 57 of the housing 16 and is secured thereto in any suitable manner, as by screws 56a. As best seen in FIGURE 1, the cover 55 contains a horizontally disposed, vertically displaced pair of air inlet slots 58 and 59 which provide access to the housing for ambient air, and a horizontally disposed, vertically displaced pair of egress slots 61a and 61b. According to the present invention, the egress slots 61a and 61b are modified to assure optimum desirable ambient air flow through the housing 16.

The jet assembly 41 is adapted to direct a stream of air underneath the cover 55, within the confines of the housing 16, to cause ambient air to be drawn in the access slots 58 and 59 and forced out of the modified egress slots 61a and 61b. The egress slots 61a and 61b are modified by providing a wedge shaped enclosure 60 mounted on the inner side of the plate 55 in the manner illustrated in FIGURES 3, 5, and 6.

The enclosure 60 includes oppositely disposed wedge-shaped walls 60a and a generally rectangular roof 62. The walls 60a and one end 63 of the roof 62 are secured to the inner side of the cover 55, preferably by welding or the like. Forming a partial floor on the ramped housing 60 is a floor section 65. The floor section overlies the lower egress slot 61b and has a knife-like inclined edge 66 extending out over the upper egress slot 61a. The flat edge 66 and the roof 62 forms a diverging downstream throat portion between the floor section 65 and the cover 62 while the floor section 65 upstream of said edge 66 forms a converging throat portion with the roof.

The aforedescribed construction and arrangement of the ramped housing 60 leaves only a narrow slit 70 for the egress of air from the housing 16. Accordingly, when air from the nozzle 51 is forced through the slit 70 it creates, by Venturi effect, a slight vacuum within the housing 16, causing ambient air to be drawn in the access ports 58 and 59. The ambient air circulates around the thermostat discs 30 and 31 until it, too is directed out of the slit 70 by the jet of air from the nozzle 51. In this manner, a constant flow of ambient air across the thermostatic discs 30 and 31 is maintained and accurate temperature response of the thermostat 15 assured. The knife edge 66 prevents air flow disturbance in the departing air.

The present invention is especially valuable in that the standard thermostats 15 and the thermostat housing covers 55 can easily be modified to incorporate the aspirator arrangement embodying features of the present invention. By merely mounting the ramped housing 60, as hereinbefore described, on the inner side of the cover 55 and inserting the jet assembly 41 in the supply pipe 21, an aspirated thermostat according to the present invention is provided.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed by Letters Patent of the United States is:

1. In a thermostatic system including a temperature sensitive thermostat mounted within a substantially closed housing, and a source of air under pressure, the improvement comprising: cover plate means on said housing, access port means in said cover plate means for ambient air to enter the housing, egress slot means in said cover plate means for air to depart the housing, jet means in said housing for directing a jet of air under said cover plate means in the direction of said egress slot means, enclosure means inside said housing overlying said slot means, said enclosure means defining a throat over said slot means which initially narrows in cross sectional dimension and subsequently increases in cross sectional dimensions whereby air forced through said throat by said jet of air creates a venturi effect to reduce pressure in the housing and draw ambient air into the housing through said access port means.

2. The improvement in thermostatic system of claim 1 further characterized in that said enclosure means is wedge shaped in configuration and includes a roof and floor secured to said cover plate, the downstream end of said floor having a knife edge formed thereon, the floor and said roof upstream of said knife edge means defining the initial narrowing portion of said throat, and the knife edge portion and said roof defining the subsequent widening portion of said throat.

3. The improvement in thermostatic system of claim 2 further characterized in that said jet means directs said jet of air parallel to said cover plate into angular impingement on said roof upstream of the narrowest point in said throat.

References Cited by the Examiner

UNITED STATES PATENTS

| 713,496 | 11/1902 | Root | 230—111 X |
|---|---|---|---|
| 2,620,983 | 12/1952 | Lyman | 236—13 |
| 2,919,068 | 12/1959 | Kautz | 236—13 |

FOREIGN PATENTS 163,906    7/1955    Australia.

ALDEN D. STEWART, *Primary Examiner.*